United States Patent Office 3,424,052
Patented Jan. 28, 1969

3,424,052
MOUNT FOR LIGHT GUNS
Walter Ruf, Landhaus am See, Thurgau, Switzerland
Filed Apr. 7, 1967, Ser. No. 629,223
Claims priority, application Germany, July 21, 1966,
R 43,744
U.S. Cl. 89—37                                9 Claims
Int. Cl. F41d 11/24; F41p 23/08

ABSTRACT OF THE DISCLOSURE

An appratus for mounting a light gun on a housing, including a mount for the gun tiltably mounted to a disc rotatably mounted in the top of said housing, control means being provided inside said housing for rotating said disc and tilting said mount, means for firing said gun extending through an opening in said disc into said housing, a periscopic sighting tube and at least one wide angle viewing device extending from inside said housing through openings in said disc and terminating outside said housing, and passage means extending from an ammunition container inside said housing through an opening in said disc, and to said gun.

BACKGROUND OF THE INVENTION

Field of the invention

The present invention relates to a mount for light weapons, and particularly for machine guns, which is arranged on the roof of an armored vehicle in such a manner that it can rotate and tilt while carrying along a periscopic telescopic sight, and can be actuated from within the armored vehicle.

Description of the prior art

In applicant's German patent application 1,196,098, there is disclosed a mount for light weapons, particularly machine guns, in connection with which there is cut at a suitable place in the roof of an armored vehicle a hole into which there is inserted a flange having a rotatable cylindrical sleeve. A periscopic telescopic sight and a system of rods for turning and tilting the mount are arranged in the cylindrical sleeve. The system of rods is developed in the manner of a parallelogram guide so that the movement of the telescopic sight takes place synchronously with the movement of the mount and therefore of the machine gun. The commencement of the firing is effected by means of a Bowden cable which is connected with the trigger of the machine gun. The viewing opening of the telescopic tube lies at such a large distance from the roof that a gunner seated in the vehicle and covered by the armoring of the vehicle can, in a normal seated position, observe the surroundings and possibly effect the aiming and firing.

In view of the fact that the field of view of the telescopic sight in this arrangement is relatively small, it will as a rule be necessary to turn the entire mount in order to better observe the terrain. An additional disadvantage resides in the fact that while the actuating of the machine gun can be effected from the inside of the vehicle, the feeding of the ammunition cannot.

SUMMARY OF THE INVENTION

It is therefore an object of the present invention to improve a mount of the aforementioned type by substantially widening the field of view of the gunner and by effecting the feeding of the ammunition from the inside of the vehicle. Furthermore, by the arrangement of the mount and the actuation thereof, the protection of the inside of the armored vehicle from ABC (atomic, biological and chemical) warfare is not impaired.

In general, the present invention provides a mount fastened in tiltable fashion on a disc which is arranged for rotation in the roof of the vehicle and which has a plurality of openings for passage of a periscopic telescopic sight, an actuating rod system for the tilting of the mount, and a firing device for the weapon, as well as passages for one or more reflecting wide angle viewing devices, and/or for the passage of the ammunition.

In accordance with a preferred embodiment, the passages and openings are developed so as to be sealed for ABC warfare protection.

In accordance with another preferred embodiment, the wide angle viewing devices consist of two rectangular solid bodies of glass, the narrow surfaces of which are beveled.

In a particularly preferred embodiment, an ammunition container located within the armored vehicle is connected to the passage for the passing of the ammunition, the point of connection being sealed for ABC warfare protection.

BRIEF DESCRIPTION OF THE DRAWINGS

Further details and features of the invention will become clear from the following description of the preferred embodiments thereof and from reference to the accompanying drawing in which.

DECRIPTION OF THE PREFERRED EMBODIMENTS

Figure 1:
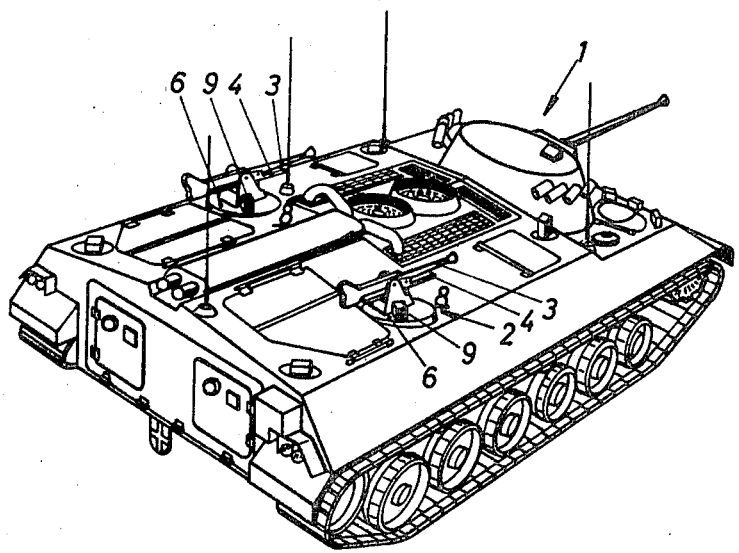
FIG. 1 is a perspective view from the rear of an armored vehicle which is provided with two mounts for light machine guns in accordance with the invention.

Referring specifically to the drawings, the reference numeral 1 depicts an armored vehicle on each side of which a mount 2 for a machine gun 3 is disposed, said mounts being symmetrical to the longitudinal axis of the vehicle. The machine gun 3 is supported so that it can tilt by means of a holder 4 in a stirrup 5. The stirrup 5 is rigidly connected with a disc 6 which, by means of a ball bearing 7, is rotatable in the roof 8 of the armored vehicle 1. In the disc 6 there are provided three passages for two glass bodies 9 serving as wide angle viewing devices and an ammunition container 10, as well as an opening for a periscope-like telescopic sight 11.

Figure 7:
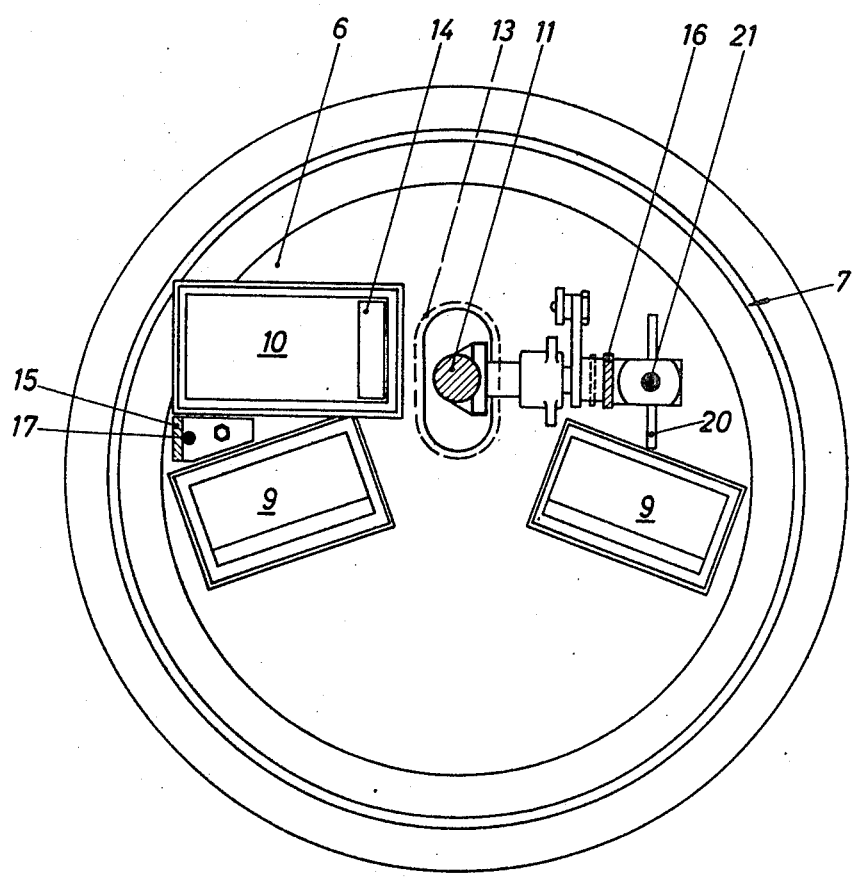
FIG. 7 is a plan view, partially in section, of the rotatable disc from the inside of the vehicle.

As can be noted from FIG. 7 of the drawing, the passages for the glass bodies 9 and the opening for the periscope-like telescopic sight 11 are so arranged that an equilateral obtuse-angled triangle is formed in which the largest side of the triangle is opposite the opening for the periscope-like sighting tube 11. The two glass bodies 9 are so directed that the field of view of a gunner 12 is approximately 180°. The solid bodies 9 are beveled on their narrow surfaces and have rectangular eyepieces and objective openings of a height of 2 to 10 cm. and a width of more than 10 cm.

Figure 3:
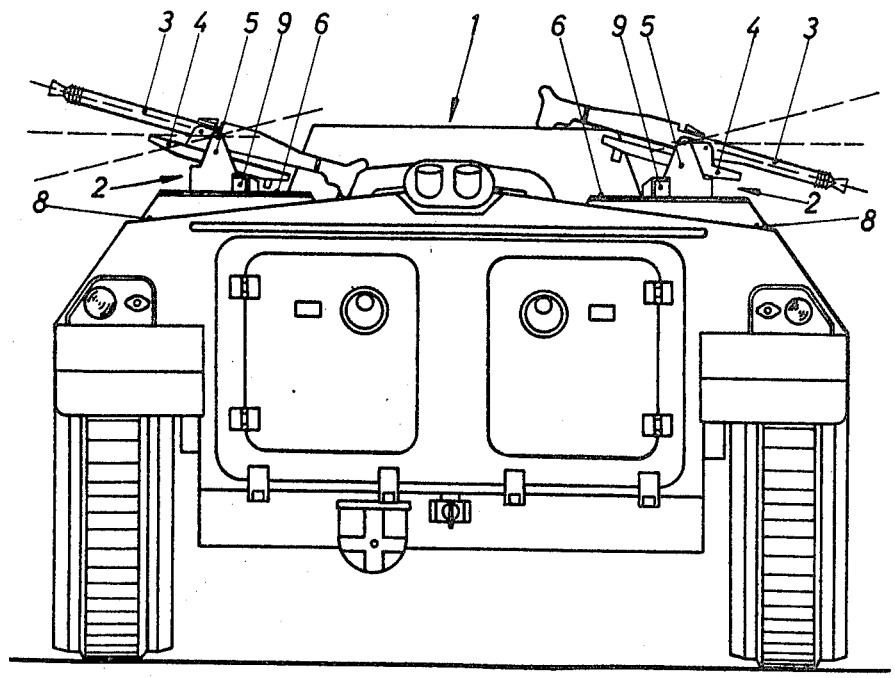
FIG. 3 is a view from the rear of the vehicle of FIGS. 1 and 2.
Figure 4:
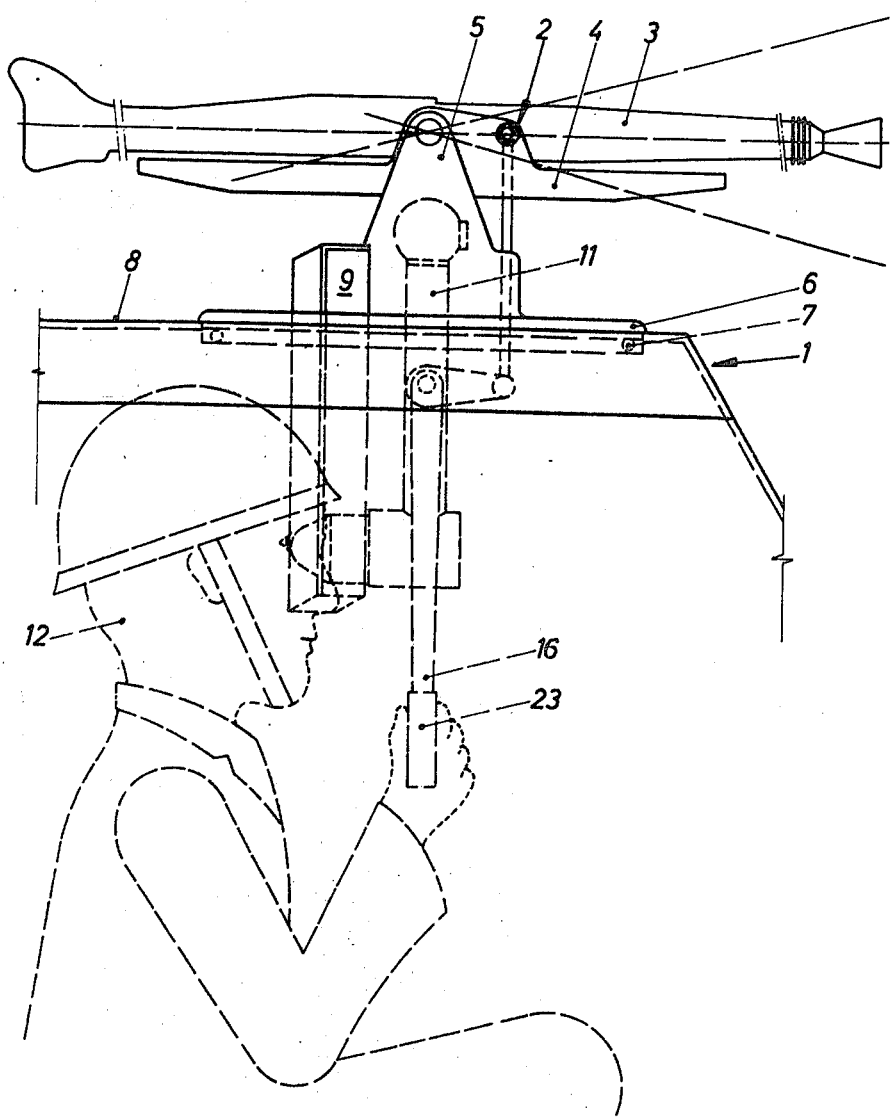
FIG. 4 is a schematic view from the side of the mount of FIGS. 1 to 3, and depicting a gunner in position.
Figure 5:
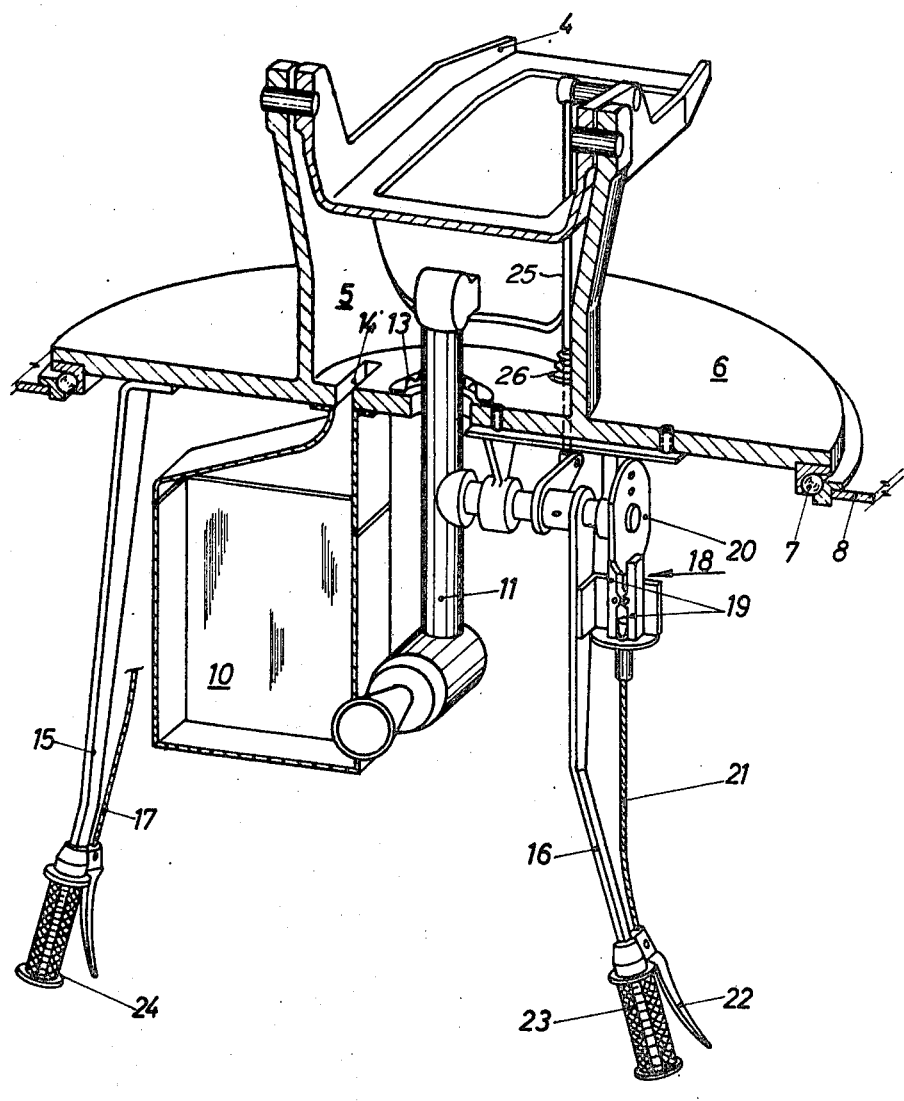
FIG. 5 is a partial section through the mount seen in perspective.
Figure 6:
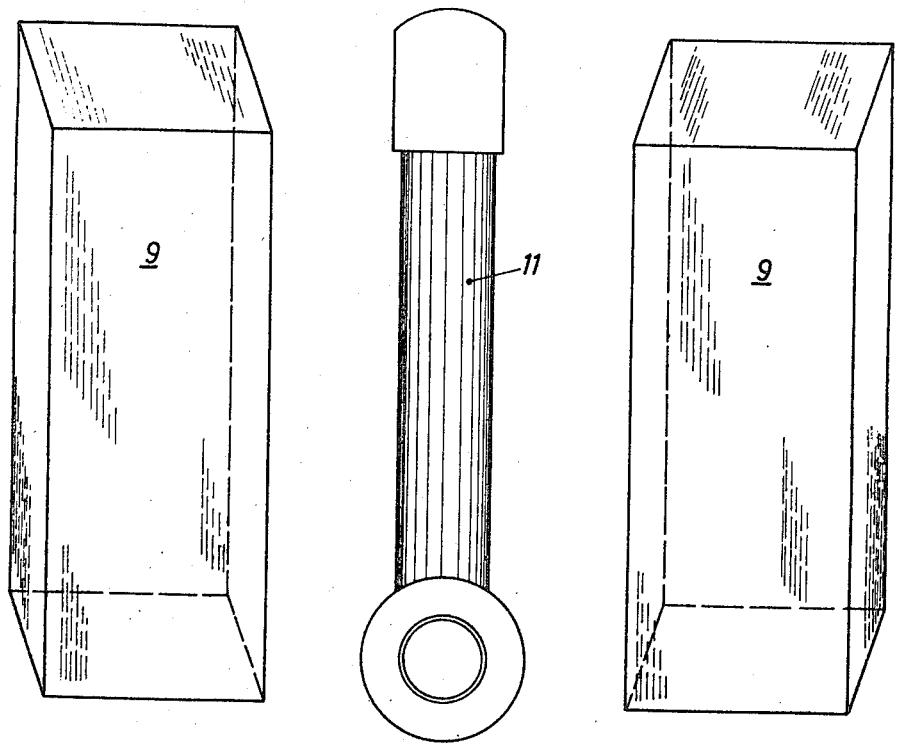
FIG. 6 is a schematic showing of the arrangement of the two glass bodies and of the periscopic sighting tube.

The two lower ends of the glass bodies 9, which are contained within the vehicle, are arranged approximately at the eye level of the gunner 12, while the two upper ends, as can be noted from FIG. 3 of the drawing, extend out of the roof 8 of the armored vehicle 1.

Figure 8:
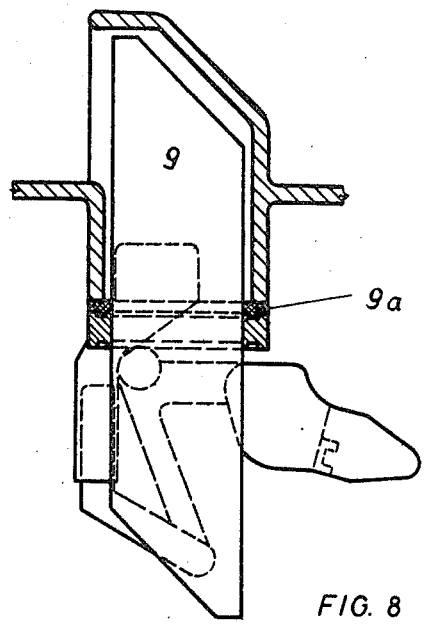
FIGS. 8 and 9 show two sections through the two glass bodies and the attachment and sighting means thereof.
Figure 9:
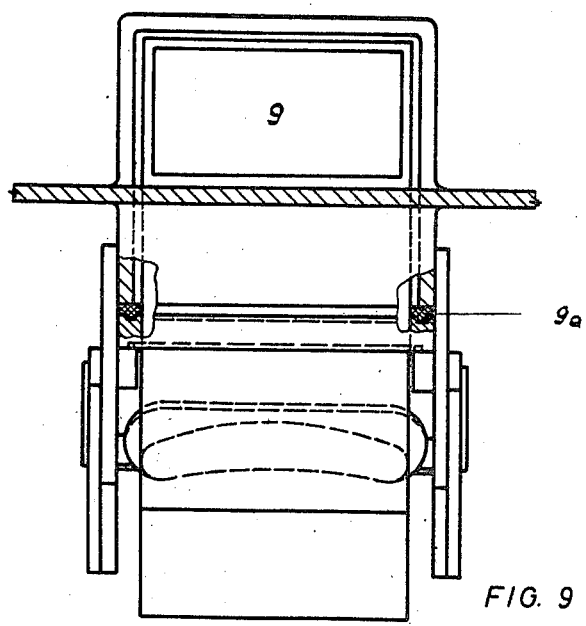

As particularly shown in FIGS. 8 and 9, each of the two glass bodies 9 is grasped tightly in a housing and arranged in replaceable manner in the corresponding passage of the disc 6. The housing has a flange with a gasket 9a which after insertion is pressed by a clamping device in sealing fashion against the edge of the opening. The periscope-like telescopic sight 11 is sealed by a packing 13 against the rotatable disc 6.

The feeding of the ammunition from the ammunition container 10 to the machine gun 3 is effected via a passage 14 in the disc 6, container 10 being attached in a sealed fashion to the passage 14.

Figure 2:
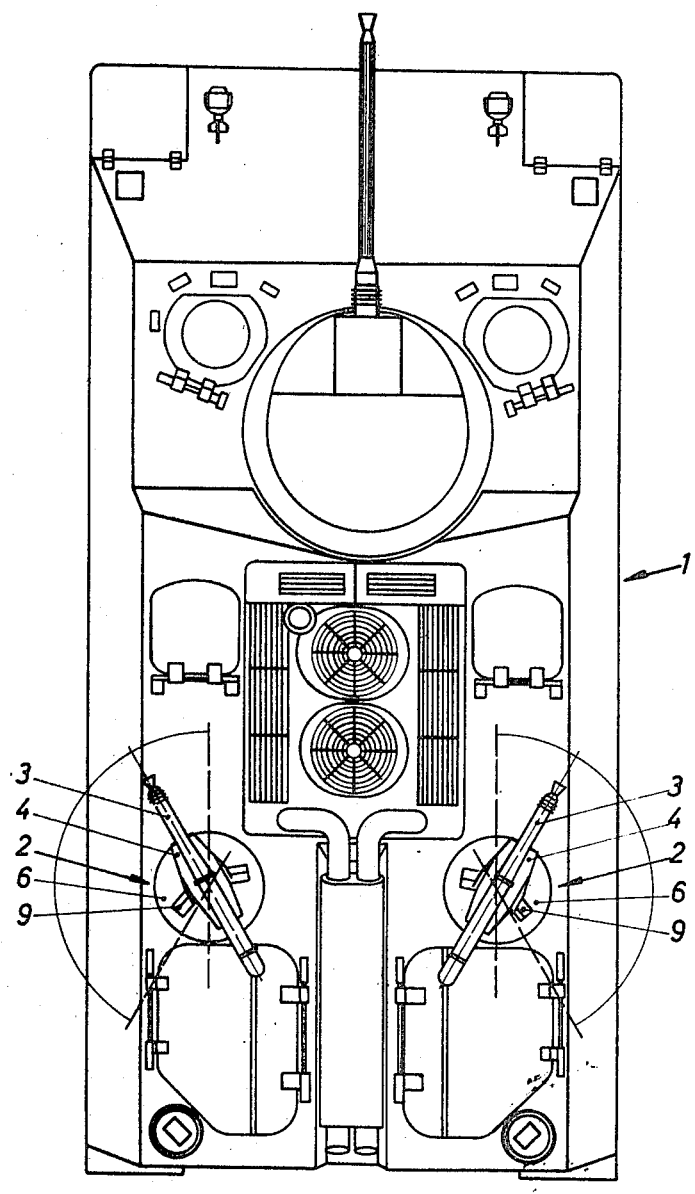
FIG. 2 is a top view of the armored vehicle of FIG. 1.

The actuating of the holder and thus of the machine gun 3 is effected by two rods 15 and 16. The rod system 15 serves for rotating the disc 6, and therefore the telescopic sight 11, and is provided with a Bowden cable 17, adapted to trigger the machine gun 3. By means of the rod 16 the tipping of the holder 4 and of the telescopic sight 11 is effected, the swinging and tipping ranges of the machine gun 3 being shown in FIGS. 2 and 3. Cable 17 and the rod 25 for actuating the holder 4 are passed in sealed fashions through seals 26 in openings in the rotatable disc 6.

The movement of the rod 16 can be fixed to lock holder 4 in any position by a brake device 18 which consists essentially of two brake blocks 19, a disc 20 rigidly connected with the disc 6 and a Bowden cable 21. By the actuating of the Bowden cable 21 by means of a hand lever 22, the two brake blocks 19 come against the stationary disc 20 whereby the holder 4 can be locked in any desired position. The ends of the two rods 16 and 15 are provided with handles 23 and 24 respectively, for actuation by the gunner 12. All passages and openings are sealed in a manner so that the inside of the armored vehicle is completely protected against ABC warfare.

A mount in accordance with the invention such as described above has essentially the following advantages:

By means of the two glass bodies serving as wide angle viewing devices, an excellent observation of the terrain with a field of view of approximately 180° is possible. If an enemy target is noted when observing the terrain, it can be immediately sighted through the periscope-like telescopic sight which lies directly and approximately centrally between the two glass bodies, and shot at, at which time the tilted position of the holder for the weapon can be retained in a very simple manner by the braking device. Upon the rotation of the telescopic sight and of the glass bodies no change in the relative position of the two viewing devices takes place, so that a rapid shifting glance from the telescopic tube to the angle mirrors and back is possible regardless of the position of the rotatable disc.

By the feeding of the ammunition from the inside of the vehicle to the weapon arranged on its roof, the safety of the vehicle against ABC warfare is not impaired since the ammunition container is sealed with respect to the rotatable disc. As a result of the relatively large capacity of the ammunition container, firing can be effected for a long period of time without interruption. The replacement of the ammunition container can be effected at a time when the safety of the inhabitants of the vehicle is not endangered. The glass bodies can also be replaced very rapidly and simply so that upon their destruction, for instance by enemy bombardment, the ability of the vehicle to defend itself will not be impaired.

I claim:

1. An apparatus for mounting a light gun on a housing and in particular a machinegun on the roof of an armored vehicle, said apparatus comprising a disc rotatably mounted in the top of the housing, a gun mount fastened on the rotatable disc with said gun mounted thereon for tilting in elevation with respect to the rotatable disc, control means operative from within said housing for turning said disc and tilting said gun, means for firing said gun from inside of the housing, telescopic sight means mounted on said disc and operatively connected to carry out the same turning and tilting movements as the gun and having an eyepiece which lies in the inside of the housing, at least one wide angle viewing means arranged on each side of the telescopic sight in the rotatable disc for observation of the terrain by the gunner, the eyepiece of each said wide angle viewing means lying within the housing.

2. The apparatus of claim 1, wherein each said wide angle viewing means comprises a substantially rectangular glass body, the narrow surfaces of which are beveled.

3. The apparatus of claim 2, wherein each of the glass bodies has a rectangular eyepiece opening and objective opening of a height of 2 to 10 cm. and a width of more than 10 cm.

4. The apparatus of claim 2, wherein there are two wide angle viewing means which are so arranged with respect to each other that the field of view is approximately 180°.

5. The apparatus of claim 2, wherein each of the wide angle viewing means is fastened in a housing in the corresponding opening of said disc in such a manner as to be readily replaceable from within said housing.

6. The apparatus of claim 1, wherein the openings for said telescopic sight and said wide angle viewing means form an equilateral obtuse-angled triangle in which the largest side of the triangle lies opposite the opening for said telescopic sight.

7. The apparatus of claim 1 further comprising an ammunition container detachably mounted directly onto the turnable disc and lying within the housing, and orifice means in said disc through which ammunition passes during feed of the gun.

8. The apparatus according to claim 1 further comprising hand brake means arranged on the inside of the housing for locking the gun in a given position of elevation independent of the position of rotation of the turnable disc, the hand brake having an actuating lever which is arranged on the control means for elevating the gun.

9. The apparatus according to claim 8 in which means for elevating the gun comprises a lever having a handle on one end thereof, a shaft fixedly connected to the other end of said lever, rod means operatively connected to transmit rotation of said shaft to said gun, and brake means to lock said shaft in rotation, said brake means comprising a brake disc rigidly attached to said rotatable disc, brake jaw means fixedly attached to said shaft, and brake actuation means at said handle for causing said jaws to grasp said brake disc thereby locking said gun.

References Cited

UNITED STATES PATENTS

| | | | |
|---|---|---|---|
| 787,855 | 4/1905 | Mustin | 88—1 |
| 2,355,049 | 8/1944 | Birdsall. | |
| 2,364,425 | 12/1944 | Corte | 89—37.5 |
| 2,454,268 | 11/1948 | Brackett. | |
| 3,309,962 | 3/1967 | Lykam | 89—40 X |

FOREIGN PATENTS

| | | |
|---|---|---|
| 1,193,399 | 5/1965 | Germany. |
| 1,196,098 | 7/1965 | Germany. |
| 448,250 | 6/1936 | Great Britain. |
| 459,337 | 1/1937 | Great Britain. |

BENJAMIN A. BORCHELT, *Primary Examiner.*

S. C. BENTLEY, *Assistant Examiner.*

U.S. Cl. X.R.

350—302; 89—40